United States Patent [19]

Vork et al.

[11] Patent Number: 4,843,841
[45] Date of Patent: Jul. 4, 1989

[54] ENERGY CONSERVING REFRIGERATION DEVICE

[75] Inventors: William D. Vork, Edina; Richard D. Lewis, Bloomington, both of Minn.

[73] Assignee: Graco Inc., Minneapolis, Minn.

[21] Appl. No.: 249,416

[22] Filed: Sep. 23, 1988

Related U.S. Application Data

[63] Continuation-in-part of Ser. No. 61,721, Jun. 10, 1987, abandoned.

[51] Int. Cl.⁴ .............................................. F25B 15/00
[52] U.S. Cl. .................................... 62/476; 62/238.3; 62/483
[58] Field of Search ....................... 62/476, 483, 238.3

[56] References Cited

U.S. PATENT DOCUMENTS

| | | | |
|---|---|---|---|
| 3,046,756 | 7/1962 | Whitlow et al. | 62/483 X |
| 3,293,881 | 12/1966 | Walker | 62/476 |
| 3,296,823 | 1/1967 | Novak et al. | 62/476 |
| 3,369,373 | 2/1968 | Merrick | 62/476 X |
| 4,619,119 | 10/1986 | Dijkstra et al. | 62/476 X |
| 4,679,409 | 7/1987 | Fitt | 62/483 X |

Primary Examiner—Lloyd L. King
Attorney, Agent, or Firm—Douglas B. Farrow

[57] ABSTRACT

Gas powered refrigeration units typically utilize a pressure reducing valve after the primary generator to reduce the pressure prior to the secondary generator in the case of a double effect system or prior to the absorber in a single system. In this invention, a fluid powered pump takes the place of the pressure reducing valve and pressurizes the refrigeration fluid from the output of the absorber from the input to the primary generator. The utilization of this motor enables a much reduced use of the main motor in the system and allows substantial reduction in the amount of energy required for operation in the system.

7 Claims, 1 Drawing Sheet

DOUBLE EFFECT
ABSORPTION CYCLE

1

ENERGY CONSERVING REFRIGERATION DEVICE

This application is a continuation-in-part of application Ser. No. 061,721 filed June 10, 1987, now abandoned.

BACKGROUND OF THE INVENTION

Refrigeration and air conditioning units which are generally powered by gas have been well known but have not achieved wide spread usage because of their relative energy inefficiency. Such devices generally comprise one or more generators which are gas fired and which have pressure reducers in the exit thereof. Such pressure reducers waste a great deal of energy thereby contributing to the lower efficiency of such units. While it has been proposed to be recover some of this energy by placing a fluid powered pump in series with the normal electrically powered circulation pump in such systems, that pump to be powered by the exhaust from the generator, such units have been unsatisfactory due to the incompatibility between the standard pumps and the fluid powered pumps which would be used.

It is, therefore, the object of this invention to provide a gas fired refrigeration system which would be much more energy efficient and capable of recovering the lost energy produced during the pressure reduction step. It is further an object of this invention to produce such a device which would be easily and inexpensive to manufacture and easily maintained.

SUMMARY OF THE INVENTION

The generally conventional gas fired double effect refrigeration unit has as an electrically powered pump which provides pressurized input to the primary generator. The output of the generator is connected to a fluid powered motor, the exhaust of which has been connected to a secondary generator during the normal mode. The output of the pump which is attached to the fluid motor is run in parallel to the electrically powered pump and attached to input of the primary generator. The inlet of the fluid powered pumps is attached to the output of the absorber which in turn is receiving the output of the secondary generator.

A similar system can be described for a single generator gas fired system operating at pressures sufficient to warrant energy recovery.

These and other objects and advantages of the invention will appear more fully from the following description made in conjunction with the accompanying drawings wherein like reference characters refer to the same or similar parts throughout the several views.

A BRIEF DESCRIPTION OF THE DRAWINGS

DESCRIPTION OF THE PREFERRED EMBODIMENT

Figure 1:
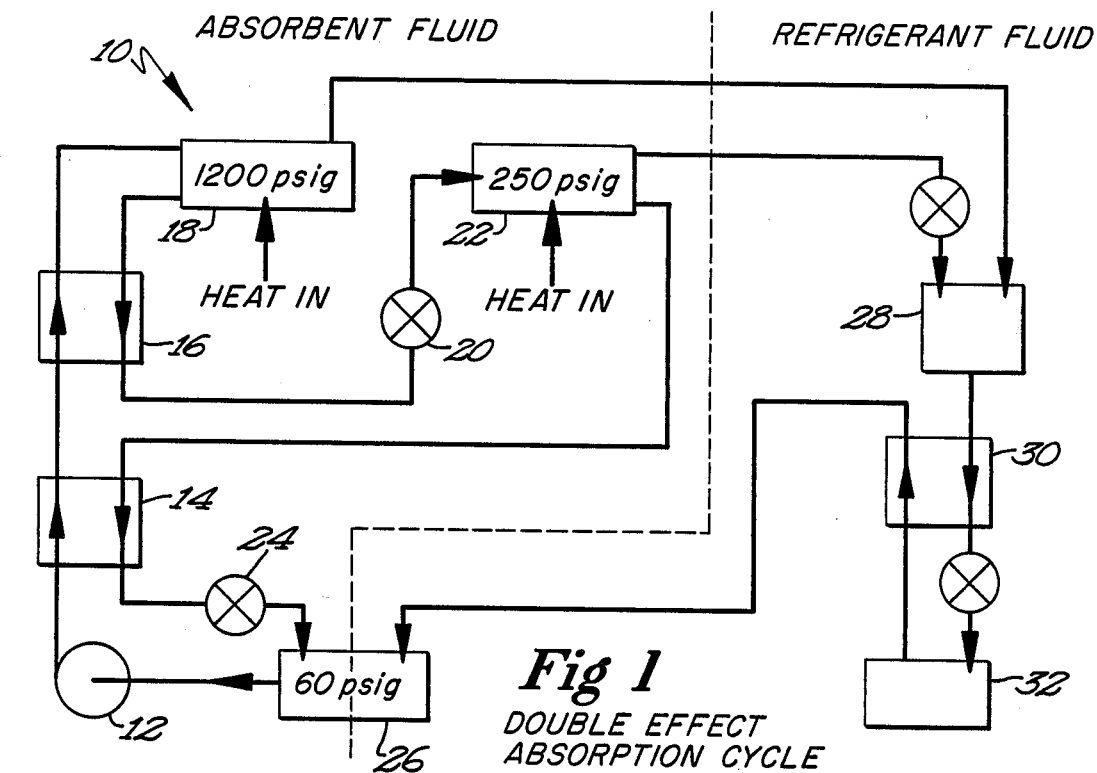
FIG. 1 is a schematic of a conventional prior art gas fired double effect refrigeration system.

The prior art refrigeration device, designated 10 is shown in FIG. 1 and is comprised generally as being electrical pump 12, the output of which leads through two heat exchangers, 14 and 16 respectively, to the inlet of the primary generator 18. The outlet of the primary generator 18 in turn passes through heat exchanger 16 and thence to pressure reduction valve 20. This can be seen from the typical values shown in FIG. 1, a substantial reduction of pressure across valve 20 results in a substantial expenditure of energy which is essentially wasted. The outlet of valve 20 is then attached to the inlet of secondary generator 22, the outlet of which in turn passes through heat exchanger 14 through a second pressure reducer valve 24 and into absorber 26. The outlet of absorber 26 is thereby fed to the inlet of pump 12 to complete the cycle.

The instant invention is concerned with the absorbent fluid side of a typical double effect absorption cycle, the division of which from the refrigerant fluid side being noted by a dotted line in FIG. 1. Shown in the refrigerant fluid side are condenser 28, heat exchanger 30 and evaporator 32.

Figure 2:
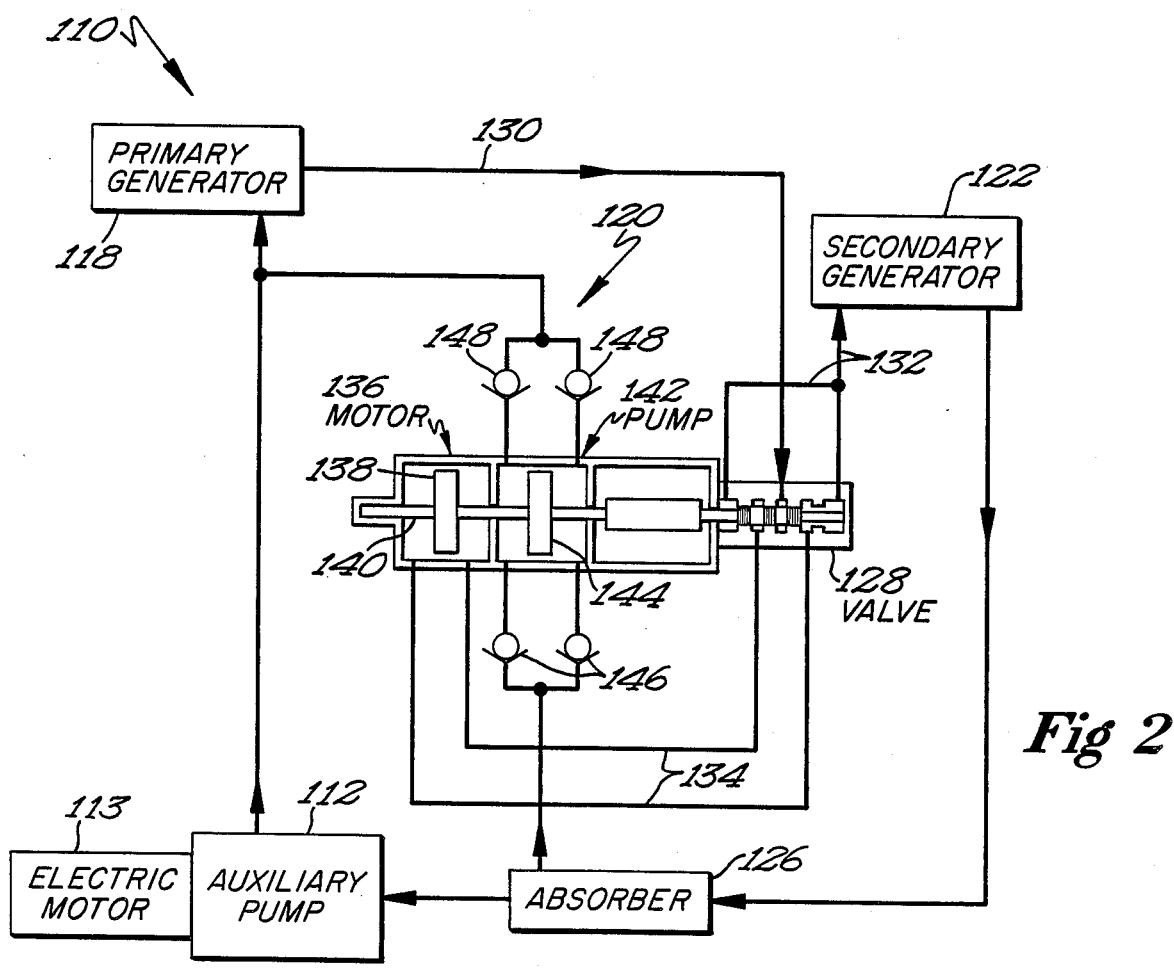
FIG. 2 is a similar schematic showing the gas fired double effect refrigeration system of the instant invention (absorption fluid side only).

Turning to the device of the instant invention shown in FIG. 2 (absorption fluid side only shown, the refrigerant fluid side being identical to that shown in FIG. 1), generally designated 110, a first pump 112 is powered by an electric motor 113. The outlet of pump 112 is fed to the inlet of primary generator 118. The outlet of primary generator 118 is fed to the fluid powered pressure reduction pump motor 120 which will be discussed in more detail hereafter. The outlet of pump 120 is thence fed to the inlet of primary generator 118. The outlet of the motor 120 is fed to the inlet of the secondary generator 122. The outlet of secondary generator 122 is thence fed to another 126, the outlet of which is thence split between and return to the electrically powered pump 112 and fluid powered pump 120.

Fluid powered reciprocating piston pump 120 is in general a conventional type of fluid powered pump and is comprised generally of a control valve 128 having an inlet port 130 which is connected to the outlet of primary generator 118 and to outlet ports 132 which lead to the input of secondary generator 122. Such fluid powered reciprocating piston pumps 120 are well known in the industry and have been sold for many years by the assignee of this application under the trademarks KING ® and BULLDOG ® as well as by other companies such as Aro Corp. and Binks Mfg. While the pump 120 has been shown in some detail, as a practical matter, one need merely plumb the pump 120 into the system such that fluid from the outlet of primary generator 118 is fed to the air (powering fluid) inlet 130 of pump 120 and the exhaust 132 fed to the inlet of secondary generator 122.

Similarly, the inlet 146 (for fluid to be pumped) of pump 120 is connected to the output of absorber 126 and the outlet 148 of pump 120 is connected to the inlet of primary generator 118. Thus it can be seen that pump 120 runs in parallel to auxiliary pump 112.

Five wavy control valve 128 feeds through lines 134 pressurized fluid to either side of fluid motor 136 and particularly the piston there and 138. Piston 138 is connected to shaft 140 to the pump portion 142 having a piston 144 therein also attached to shaft 140. Pump portion 142 is fed by dual inlet checks 146 which received their input from absorber 126 and also has dual outlet checks 148 which in turn are connected to the input of primary generator 118.

By running the fluid powered motor 120 in the schematic shown in FIG. 2, a substantial reduction in the amount of energy required to run the system results. In particular, the amount of electric energy required to run the motor 113 and corresponding pump 112 is approximately one-third of that required to run a similarly sized figure system in FIG. 1. The two-thirds savings representing approximately the amount of energy lost through valve 20 in the prior art system.

It is contemplated that various changes and modifications may be made to the refrigeration device without departing from the spirit and scope of the invention as defined by the following claims.

What is claimed is:

1. In a gas refrigeration device having a primary generator, a secondary generator, an absorber, pumping means providing pressurized fluid to said primary generator and means for reducing the pressure of the output of said primary generator, the improvement comprising:
   a fluid powered motor plumbed to the output of said primary generator so as to utilize the energy in the pressured fluid at said generator outlet to run said motor;
   a primary pump driven by said fluid powered motor; and
   an auxiliary pump, said pumps being plumbed in parallel to one another, the output of said pumps being connected to the input of said primary generator.

2. The gas refrigeration device of claim 1 wherein the inputs of said pumps are connected to said absorber.

3. The gas refrigeration device of claim 1 wherein said pump is a reciprocating piston pump.

4. The gas refrigeration device of claim 1 wherein said primary motor is a reciprocating piston motor.

5. The gas refrigeration device of claim 4 wherein said auxiliary pump is driven by a electric motor.

6. The gas refrigeration device of claim 1 wherein said motor is driven by a five-way valve.

7. In a gas refrigeration device having a generator, an absorber, pumping means providing pressurized fluid to said generator and means for reducing the pressure of the output of said generator, the improvement comprising:
   a fluid powered motor plumbed to the output of said generator so as to utilize the energy in the pressurized fluid at said generator outlet to run said motor;
   a primary pump driven by said fluid powered motor; and
   an auxiliary pump, said pumps being plumbed in parallel to one another, the output of said pumps being connected to the input of said generator.

* * * * *